(12) United States Patent
Duffie

(10) Patent No.: US 9,016,604 B2
(45) Date of Patent: Apr. 28, 2015

(54) PORTABLE VEGETATION TREATMENT SYSTEM

(75) Inventor: Kelly Mark Duffie, Cypress, TX (US)

(73) Assignee: Helena Holding Company

( * ) Notice: Subject to any disclaimer, the term of this patent is extended or adjusted under 35 U.S.C. 154(b) by 551 days.

(21) Appl. No.: 13/422,526

(22) Filed: Mar. 16, 2012

(65) Prior Publication Data

US 2013/0240636 A1    Sep. 19, 2013

(51) Int. Cl.
*B05B 3/00*    (2006.01)
*B05B 3/18*    (2006.01)
*B05B 7/26*    (2006.01)
*B05B 7/04*    (2006.01)
*B05B 7/24*    (2006.01)
*A01M 7/00*    (2006.01)

(52) U.S. Cl.
CPC ............... *B05B 7/26* (2013.01); *B05B 7/0408* (2013.01); *B05B 7/2497* (2013.01); *A01M 7/0042* (2013.01); *A01M 7/0046* (2013.01); *A01M 7/0092* (2013.01)

(58) Field of Classification Search
CPC ......... B05B 7/04; B05B 7/0408; A01G 25/00
USPC ............. 239/1, 310, 172, 722, 723, 724, 726, 239/727
See application file for complete search history.

(56) References Cited

U.S. PATENT DOCUMENTS

| | | | | |
|---|---|---|---|---|
| 3,920,552 A | * | 11/1975 | Elkern | 210/141 |
| 5,310,113 A | * | 5/1994 | Cowgur | 239/10 |
| 5,816,498 A | * | 10/1998 | Smith et al. | 239/172 |
| 7,717,353 B2 | * | 5/2010 | Matulis | 239/1 |
| 8,800,887 B2 | * | 8/2014 | Moeller et al. | 239/159 |
| 2007/0256556 A1 | * | 11/2007 | Rawlings | 92/165 R |

* cited by examiner

*Primary Examiner* — Ryan Reis
(74) *Attorney, Agent, or Firm* — Drinker Biddle & Reath LLP

(57) ABSTRACT

A portable vegetation treatment system includes a primary pump, a secondary pump, an intake-port assembly, a distribution assembly, and a control assembly. The primary pump is configured to couple with a diluent source while the secondary pump is configured to couple with a reservoir, containing a chemically-based fluid. The chemically-based fluid may be a concentrate, pre-mixed concentrate or other fluid(s), requiring dilution or combination with another fluid before application. The secondary pump includes components that meter one or more chemically-based fluids, during active operation. These components also substantially restrict migration or inappropriate flow of the chemically-based fluid when the system is inactive or in a passive state.

20 Claims, 9 Drawing Sheets

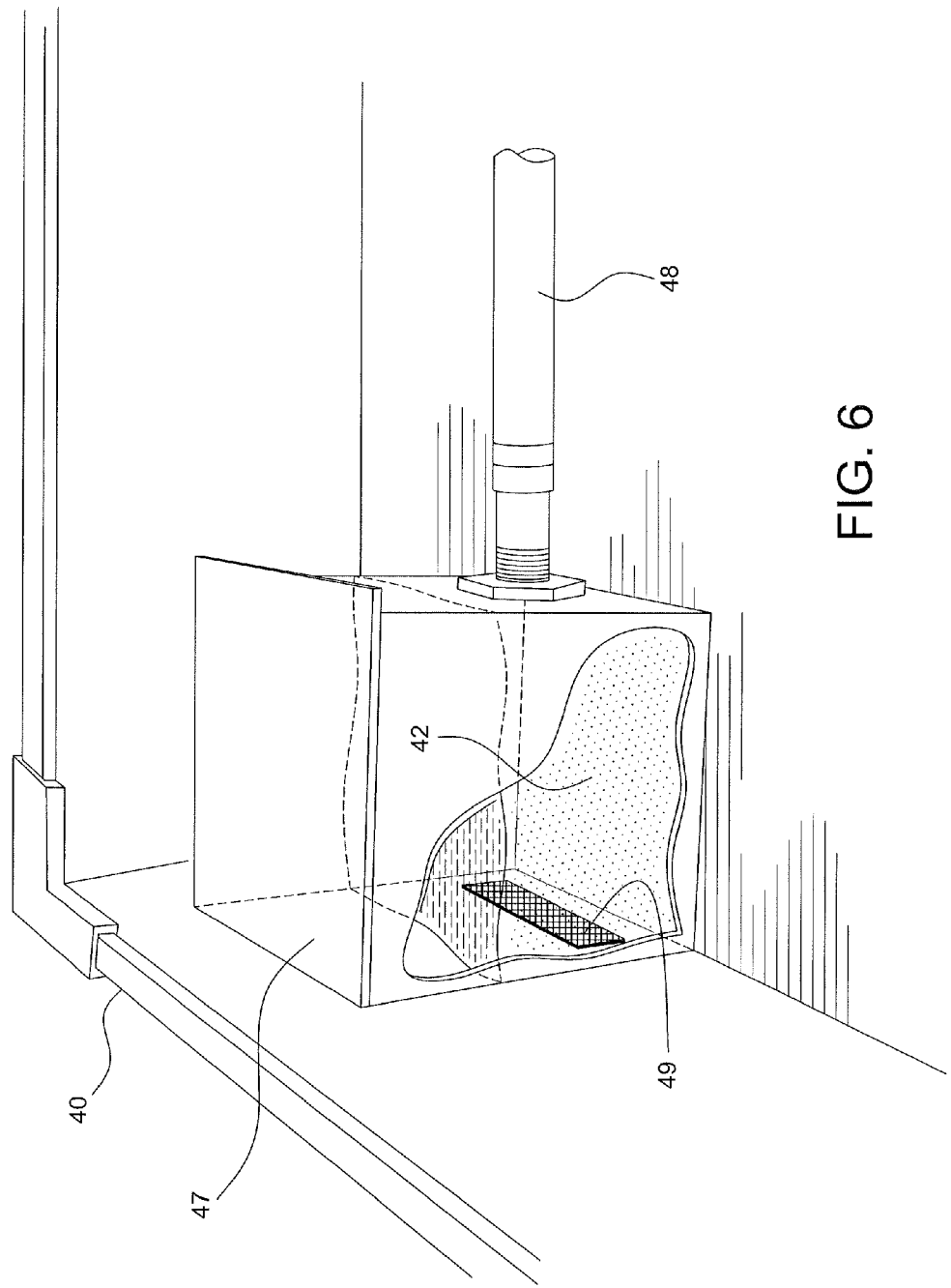

PORTABLE VEGETATION TREATMENT SYSTEM

BACKGROUND OF THE INVENTION

1. Field

The present disclosure relates to portable vegetation treatment systems.

2. Background

Chemically-based fluids, such as pesticides, surfactants, and drift control agents are often used to control unwanted pests and/or vegetation. These chemically-based fluids are typically manufactured as concentrates, and subsequently mixed with a water-based diluent in often cumbersome spray-tanks before application.

Particular care must be taken by those who handle and use concentrates, as serious harm can occur upon improper exposure. Due to safety concerns, among other reasons, some manufacturers of chemically-based fluids elect to sell ready-to-use formulations to eliminate the potential for applicator-exposure to chemically-based concentrates.

For economic reasons, however, many consumers still desire to use concentrated chemically-based fluids such as pesticide concentrates. Because of their concentrated nature, pesticide-concentrates are generally more cost effective than ready-to-use versions. Manufacturers of pesticide-concentrates must, therefore, provide consumers with specific application instructions, which include acceptable types of diluents and appropriate diluent-concentrate mixing ratios.

Before application, pesticide-concentrates are diluted with water or other suitable diluent(s) within a mixing tank, which is then transported to areas identified for treatment. The mixing tank represents the bulkiest and heaviest component of conventional pesticide-concentrate application equipment, often requiring large trucks, boats or other transport vehicles of sufficient size and capacity to accommodate the mixing tank and additional system components. Typically, these transport vehicles are configured to support mixing tanks, pumping systems, spray-hoses, couplings, and additional components required to facilitate mixing and distribution of the pesticide-concentrate after mixing with a diluent.

Some pesticide-concentrate distribution systems have proposed sourcing water-diluent from a lake or river. However, these systems still require the use of large and heavy mixing tanks. Therefore, for transporting purposes, these systems still require use of vehicles which are particularly large.

Other systems have attempted to use pumping systems and conduits for mixing purposes which lessen the footprint occupied by vegetation treatment systems. But in operation, these latter systems are known to encounter various problems. Frequently these problems involve effectively and consistently overcoming pressures within the system, blending a pre-mixed concentrate with a diluent at specified ratios, and distributing prepared product.

In view of the limitations of these and other proposed systems, there is a clear need for improved treatment systems. The present invention fulfills many of these needs and provides further related advantages, as described in the following summary.

SUMMARY

The present invention relates to a portable vegetation treatment system that includes a primary pump, a secondary pump, an intake-port assembly, a distribution assembly, and a control assembly. The primary pump is configured to couple with a diluent source while the secondary pump is configured to couple with a reservoir, containing a chemically-based fluid. The chemically-based fluid may be a concentrate, pre-mixed concentrate or other fluid(s), requiring dilution or combination with another fluid before application. The secondary pump includes components that meter one or more chemically-based fluids, during active operation. These components also substantially restrict migration or inappropriate flow of the chemically-based fluid when the system is inactive or in a passive state.

Coupled to the primary pump is an intake-port assembly that receives and combines the diluent and the chemically-based fluid. In addition, a distribution assembly is coupled to an outlet-port of the primary pump. The distribution assembly is configured to discharge the combined diluent and chemically-based fluid onto targeted vegetation within pest management areas.

A more complete understanding of the vegetation treatment system will be afforded to those skilled in the art, as well as a realization of additional advantages and objects thereof, by consideration of the following detailed description. Reference will be made to the appended sheets of drawings which will first be described briefly.

BRIEF DESCRIPTION OF THE DRAWINGS

In the drawings:

FIG. 6 shows a top perspective view of a floating vessel, having a inboard flooding and filtration compartment.

DETAILED DESCRIPTION

Figure 1A:
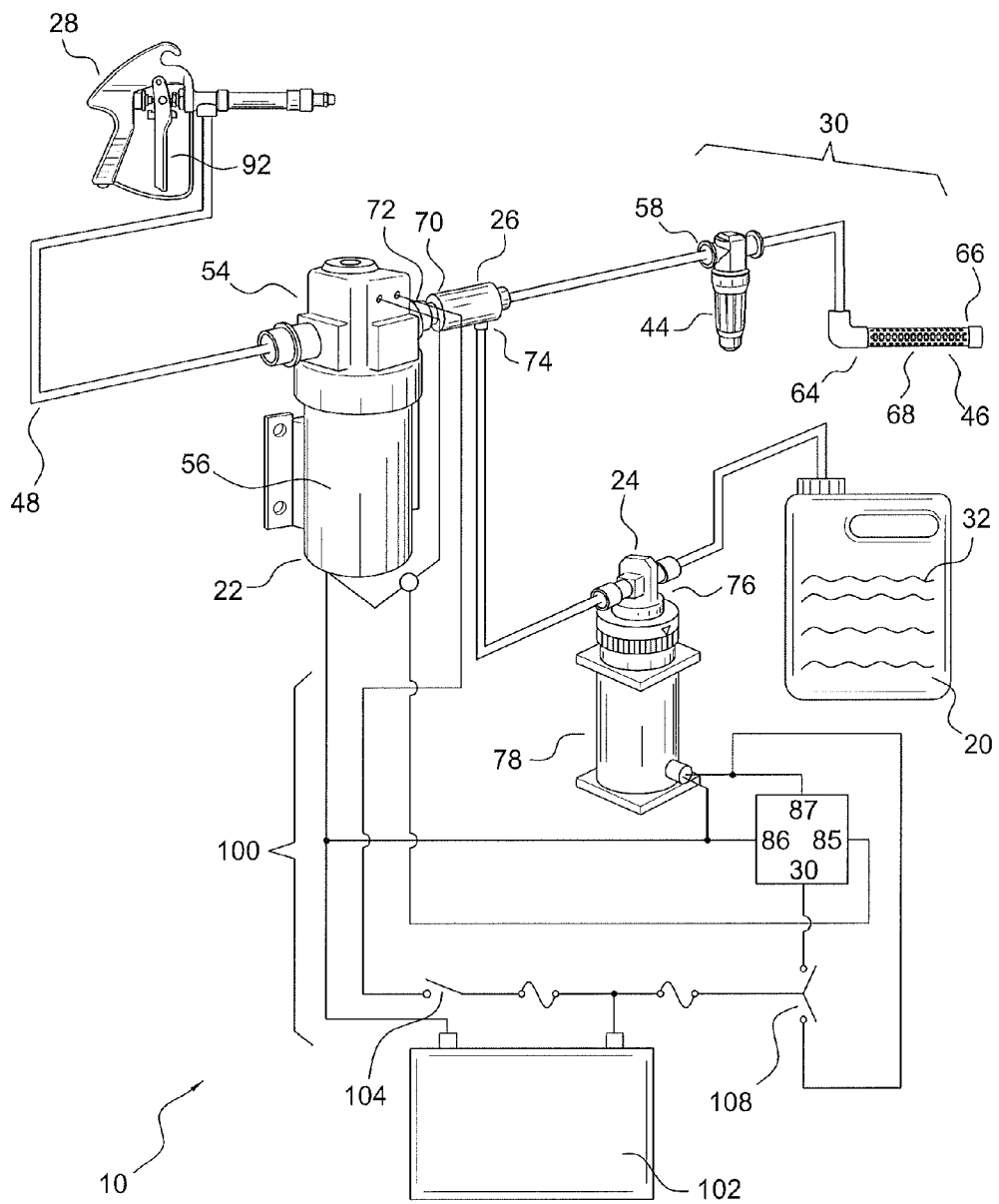
FIG. 1A schematically shows a first embodiment of a portable vegetation treatment system.

FIGS. 1A, 1B, 2 and 3 show portable vegetation treatment systems 10 that include a reservoir 20, a primary pump 22, a secondary pump 24, an intake-port assembly 26, a distribution assembly 28, a diluent filtration system 30, and a control system 100. Disposed within the reservoir 20 is a chemically-based fluid 32, such as a pesticide or herbicide, which can be used for treatment of vegetation. Other types of chemically-based fluids suitable for use in the system are pre-mixed concentrates, which may include ratios of herbicides, pesticides, surfactants, and drift control agents. For example, one-type of pre-mixed concentrate could include ratios of CLEARCAST® Herbicide manufactured by BASF, DYNE-AMIC® manufactured by Helena Chemical Co. and STA-PUT® Drift Control Agent, also manufactured by Helena Chemical Co. Other types of chemically-based fluids include RODEO® Herbicide manufactured by Dow Chemical Co., TOUCHDOWN PRO® Herbicide manufactured by Syngenta, and HARDBALL® Herbicide manufactured by Helena Chemical Co. In addition to the fluids mentioned, the chemically-based fluid may also include a colorant, preferably a fluidic colorant, which provides visual confirmation of treated vegetation.

Figure 2:
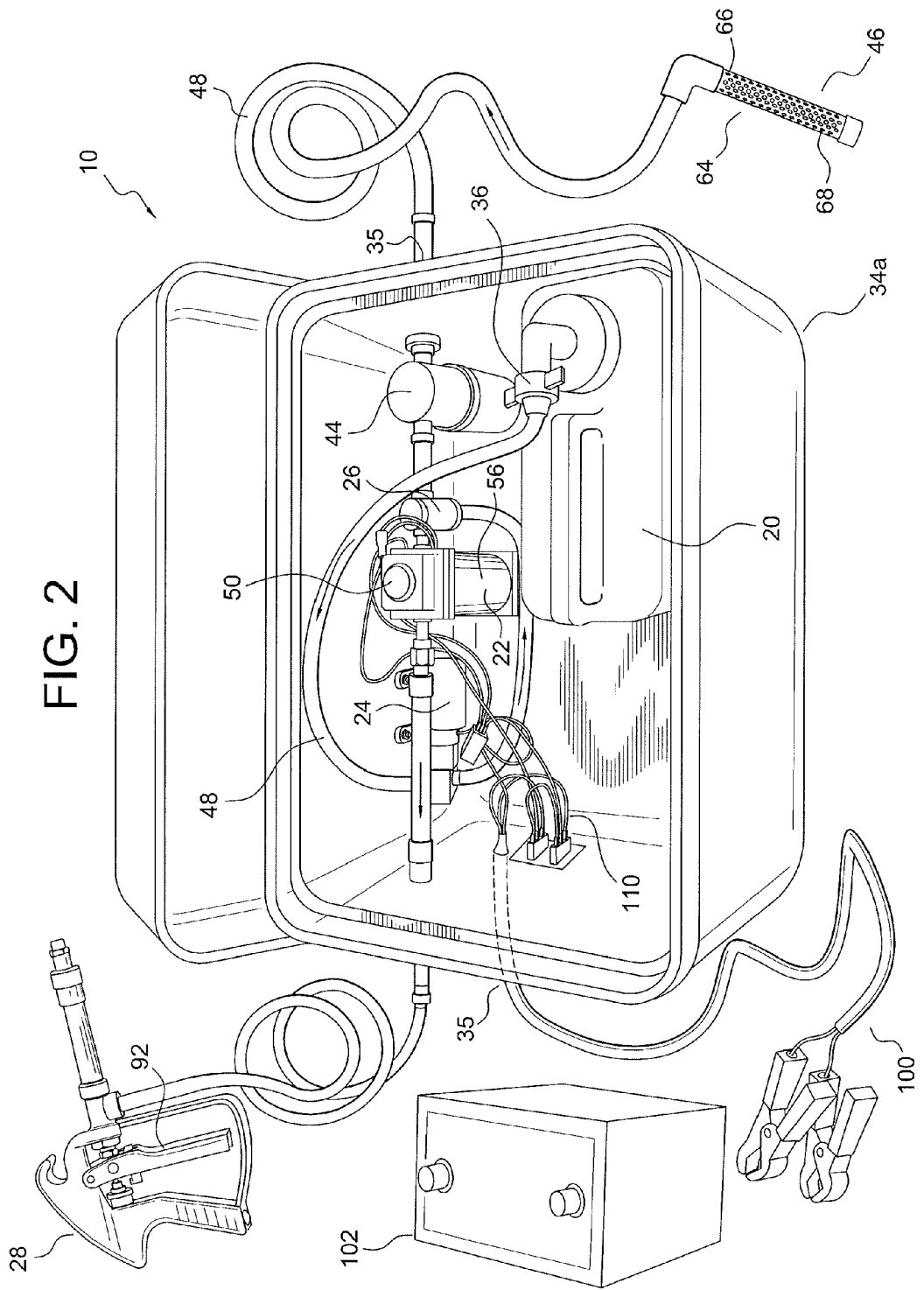
FIG. 2 is a top view of one type of portable vegetation treatment system.

The reservoir is a container manufactured from one or more materials generally chemically compatible with the chemically-based fluid. In the configurations shown, the reservoir may be manufactured from high density polyethylene ("HDPE"). The reservoir may be of sufficient size and shape for placement inside a container 34a, as shown in FIG. 2 or positioned outside of a container 34b, as shown particularly in FIGS. 3 and 7. Coupled to either type of container is a tubing coupler 36 (FIGS. 2 and 3), which is preferably a quick-connect fitting configured for rapid coupling with successive containers after depletion of the chemically-based fluid occurs. The tubing coupler may have any size or configuration suitable for coupling with a container and/or a conduit coupled to the container. In one embodiment of the system, the tubing coupler has an outer diameter of about 0.25 inches.

Regardless of their size or shape, containers 34a, 34b may be manufactured from one or more substantially weather resistant materials. Containers may also be manufactured from one or more materials which are substantially chemically resistant to the chemically-based fluid. Such materials may include, but are not limited to, polymeric materials, fiberglass, or aluminum. Both types of containers 34a, 34b have a plurality of apertures 35 which facilitate coupling with the diluent source 38, the distribution assembly 28, and other system components, as further described below.

FIG. 2 shows one embodiment of the system 10 in which the majority of its elements are disposed within container 34a. In this embodiment, the portable vegetation treatment system 10 is configured for placement onto a floating vessel 40 or other suitable vehicle. Disposed within the container 34a are the primary pump 22, the secondary pump 24, the control system 100, and the first filtering element 44 of the diluent filtration system 30 (FIGS. 1 and 2). The primary pump may be any type of pump suitable for displacement of a diluent from its source to the distribution assembly 28, using conduits 48. Coupled to the primary pump 22 are one or more primary pump controls 50, which operate upon activation of the distribution assembly 28. Thus, when an operator activates the distribution assembly 28, the primary pump controls 50 are activated. This on-demand type control system is further described below.

Figure 5A:
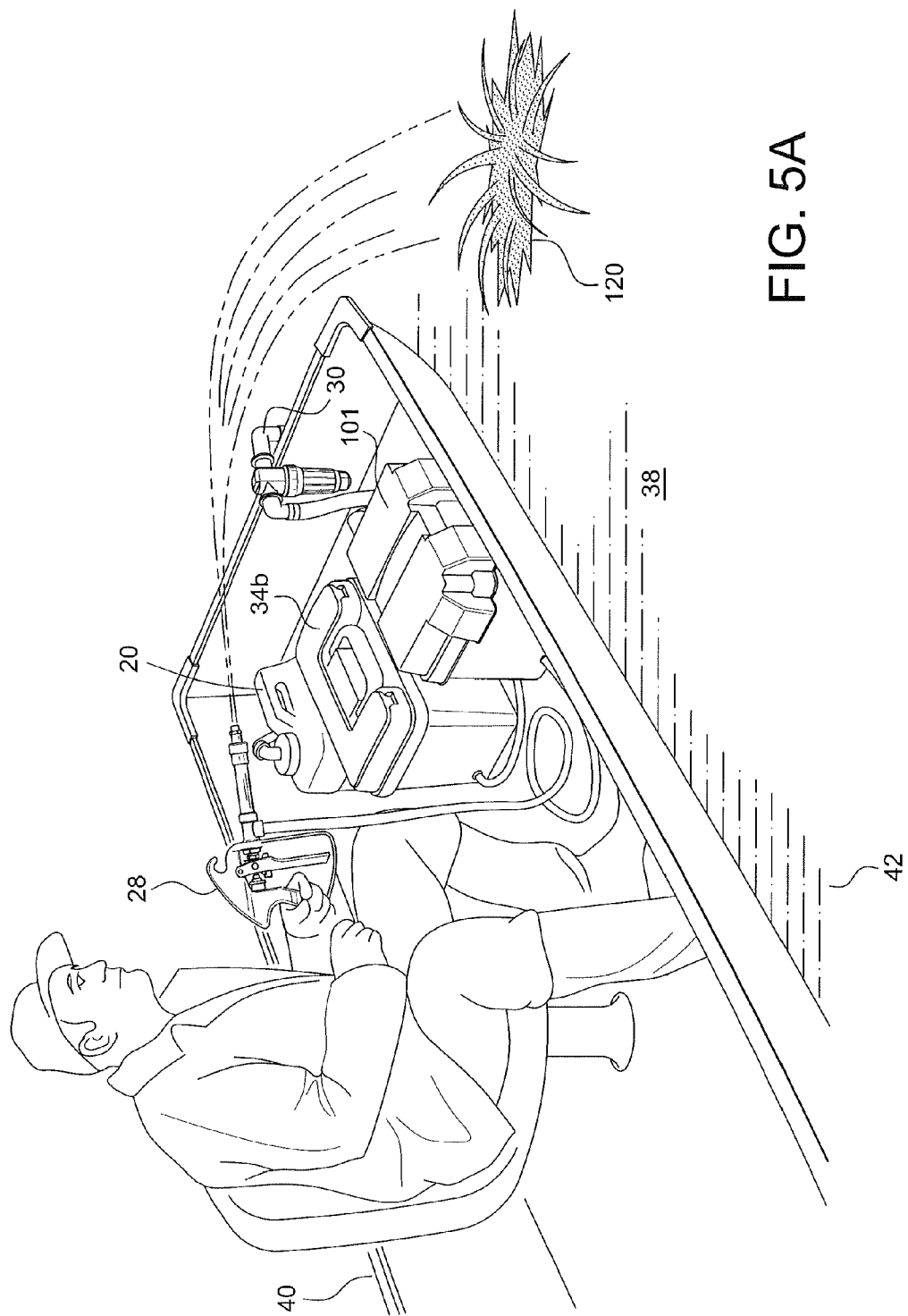
FIG. 5A shows a portable vegetation treatment system disposed on a floating vessel.
Figure 5B:
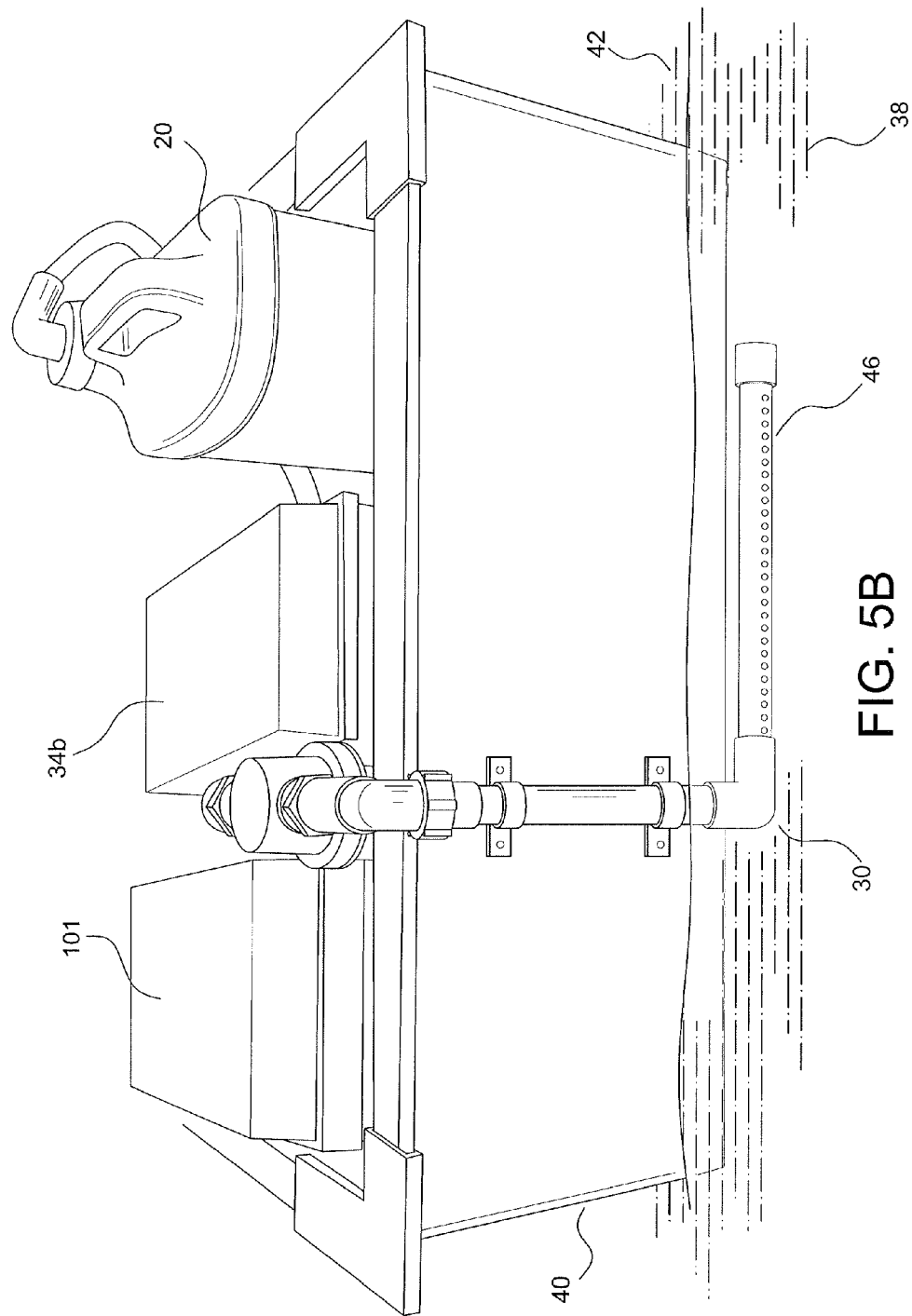
FIG. 5B shows a rear view of the floating vessel and portable vegetation treatment system shown in FIG. 5A.

The primary pump 22 sources a diluent 42 from its diluent source 38, as shown particularly in FIGS. 5A-5B. In so doing, the primary pump 22 is driven by a primary pump motor 56. In one configuration, the primary pump 22 includes a pump head 54 and a primary pump motor 56 encased by cooling devices (not shown) such as cooling fans or fins. These cooling devices allow for extended duty-cycles without overheating. One type of pump suitable for use in the system is the SHURFLO® 2088 Series Diaphragm Pump, having an automatic demand system and a continuous duty fin-cooled motor. As such, the primary pump may be rated for a voltage of 12 VDC, and used with pressures ranging from about 10 pounds per square inch (psi) to about 40 psi.

Primary pumps used within the system may produce flow rates ranging from about 2 gallons per minute (gpm) to about 15 gpm. In one configuration, the primary pump is rated at 3.6 gpm of volume at open flow. Flow rates, however, may vary, depending on the nature of treatment, vegetation-types, the selected pumping system, and other application parameters.

Figure 1B:
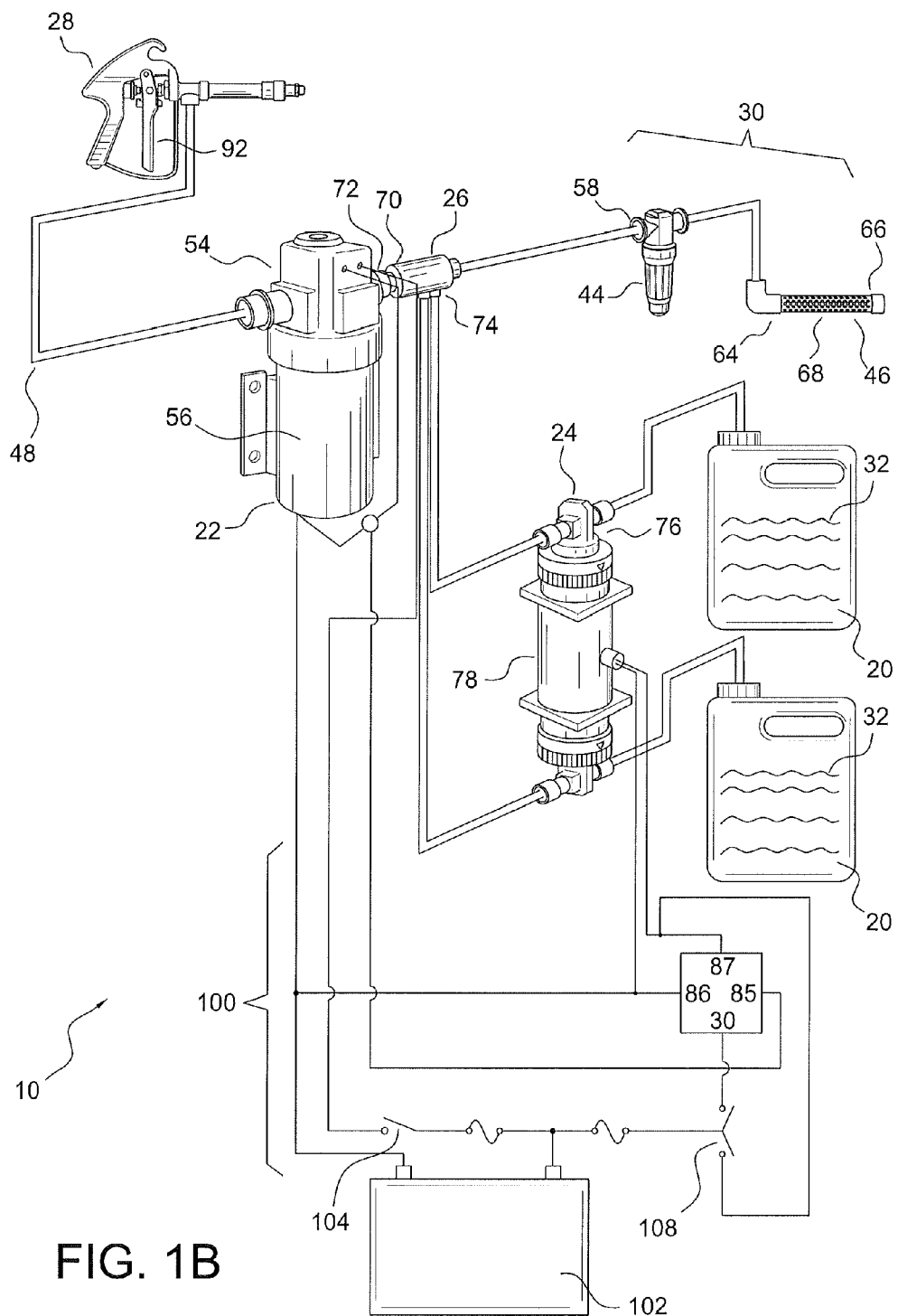
FIG. 1B schematically shows a second embodiment of a portable vegetation treatment system.

Positioned between the diluent source 38 and the primary pump 22 is the diluent filtration system 30. In one configuration, the filtration system 30 includes at least two filtering elements 44, 46, as shown in FIGS. 1A and 1B. The first filtering element 44 is preferably a T-shaped strainer-type element. The first filtering element 44 includes a housing 58, one or more strainer elements 60 (not shown) and at least one sealing device 62 (not shown).

In one configuration, the first filtering element is designed to withstand pressures up to 150 pounds per square inch (psi) at 70 degrees Fahrenheit (° F.) and is suitable for temperatures up to 140° F. The housing material is preferably nylon or other materials with acceptable chemical resistance and which can meet the aforementioned pressure and temperature ratings. Optionally, the housing material may also be substantially transparent to allow visual inspection of the first filtering element.

Strainer elements may include screens manufactured from stainless steel or other suitable mesh materials that have good chemical and weather resistance. The sealing device may be made from elastomeric materials, including but not limited to, nitrile (Buna-N) or fluoroelastomers. One type of suitable material is VITON® manufactured by the DuPont Corporation. Other suitable materials include EPDM and Santoprene.

The second filtering element 46 may be used when the system is disposed on a vessel 40 or other vehicle positioned above the diluent source 38. For example, as shown in FIGS. 5A-5B, the system may be positioned on a floating vessel such as a boat, barge, kayak, canoe or amphibious-type vehicle. When the system is positioned in this manner, the second filtering element 46 is placed such that it extends to the diluent source through an exterior intake-device or an inboard flooding compartment 47, preferably including a screen-filter that spans the hull-perforations 49 (FIG. 6). Moreover, the second filtering element may be designed as a manifold assembly 64, as shown particularly in FIGS. 1-3. Moreover, the second filtering element may be designed as a manifold assembly 64, as shown particularly in FIGS. 1 and 4. The manifold assembly 64 includes a conduit element 66 having perforations 68 that inhibit passage of debris which would otherwise interfere with use of the system. Additional components may also be added to the manifold assembly to facilitate positioning of the diluent filtration system on various types of vessels.

In operation, the filtering system has at least two-stages. In a first stage, debris is filtered from the diluent through a perforated intake device or through a perforated section of a vessel hull, where the perforated section allows diluent to enter an on-board flooding compartment such as that shown in FIG. 6. Stage two uses straining elements to further prevent infiltration of debris. Preferably, the second stage uses straining elements which prevent the transmission of smaller debris particles within the system. The type of debris depends on the nature of the diluent source.

As used herein, a diluent source should be broadly construed as any type of fluid that acts to dilute the chemically-based fluid. As such, the diluent source may be water, a body of water, or other fluid that dilutes the chemically-based fluid according to treatment parameters. Where the system 10 is used on board a vessel 40, as shown in FIGS. 5A-5B, the diluent source 38 may be a body of water. Some types of bodies of water which are appropriate for placement of the system 10 onboard a floating vessel 40 include, but are not limited to, wetlands, lakes, ponds, rivers, and canals. Thus, the filtering system may encounter organic and inorganic debris such as plant materials, suspended colloids, insects, mud, trash, rocks, etc.

Figure 7:
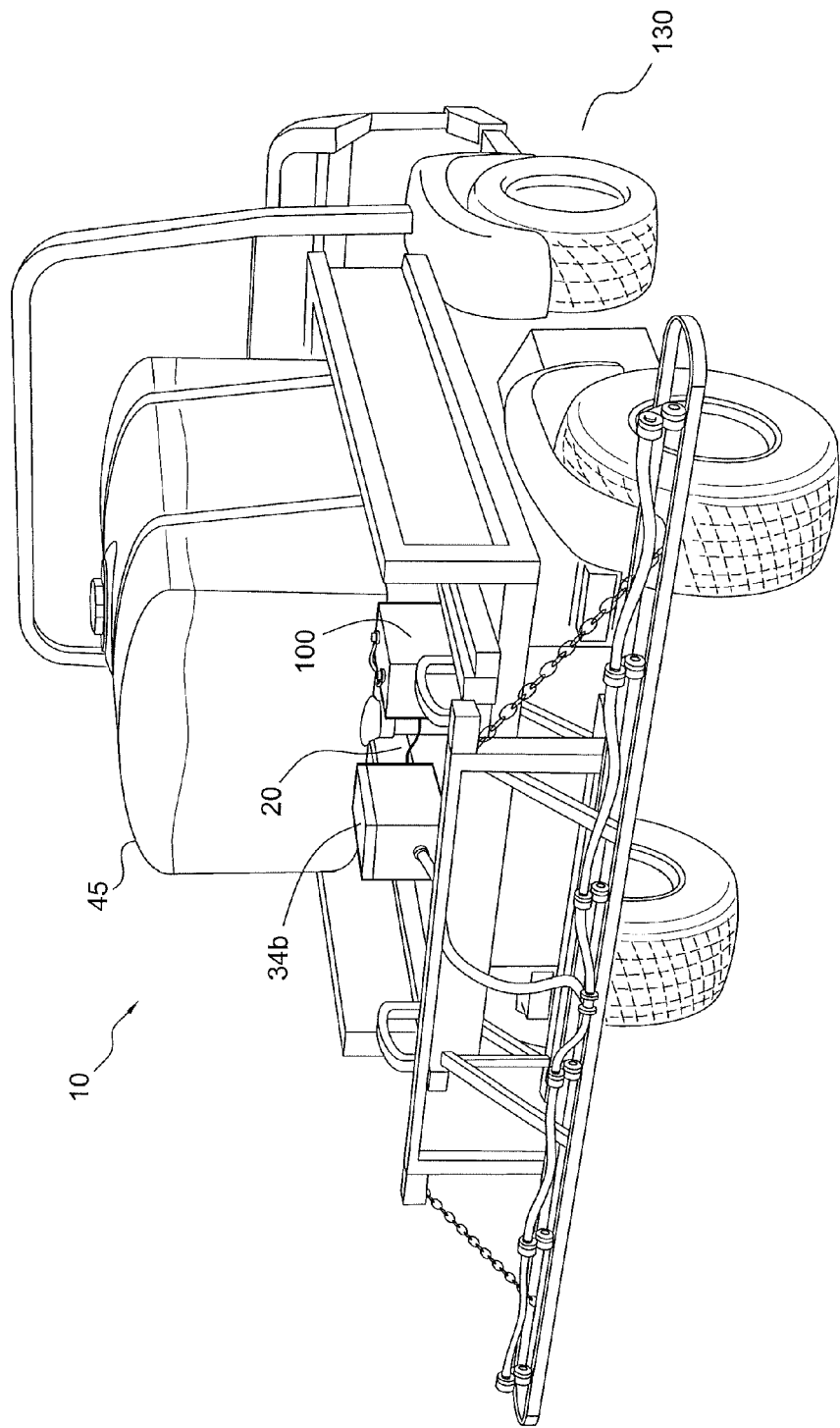
FIG. 7 shows a rear perspective view of a land vehicle, including a portable vegetation treatment system.

The diluent source may also be disposed within a diluent container 45. The diluent container may be placed on a land vehicle 130, as shown in FIG. 7, or floating vessel of any size or shape. However in preferred configurations, the diluent container is of sufficient size and shape that lends to the portability of the system. Regardless of the nature of the diluent source, the diluent contained within the diluent source is in most situations a water-based fluid. Thus, the diluent is substantially made of water. For most situations, the diluent has percentage of water ranging from about 95% to about 100%.

When the system is disposed on a vessel in a body of water, the system 10 may be configured for the diluent 42 to travel from the diluent source 38, through the filtration system 30 to an intake-port assembly 26. The intake-port assembly is coupled to both the primary pump 22 and the secondary pump 24. The intake-port assembly receives and combines the diluent 42 and the chemically-based fluid 32, as schematically shown in FIGS. 1A and 1B.

The intake-port assembly 26 includes an intake conduit 70 which defines a passageway and mixing chamber for both chemically-based fluid 32 and the diluent 42. As such, the intake-port assembly 26 includes coupling portions 72, 74 that allow the assembly to couple, respectively, with the primary pump and the secondary pump. The intake-port assembly 26 thus includes one or more materials suitably compatible for combination of the diluent and the chemically-based fluids. Coupling portions 72, 74 preferably include or are manufactured from substantially transparent materials, which allow an operator 77 to verify the presence and migration of the chemically-based fluid.

The chemically-based fluid 32 enters the intake-port assembly 26 from the secondary pump 24. The secondary pump 24 meters and substantially maintains the rate of flow rate of the chemically-based fluid as it is fed to the intake-port assembly. The secondary pump feeds the chemically-based fluid to the intake-port assembly by positive-pressure injection, preferably using one or more valveless injection-type pump heads 76 driven by a secondary pump motor 78.

The valveless injection-type pump head(s) is/are preferably of the type shown and described in U.S. patent application Ser. No. 11/799,978, which is incorporated herein by reference. These types of valveless injection-type pump heads include cylindrical pistons disposed within cylinders, where both the piston and cylinder are made of ceramic or other suitable material(s). Pistons used in this type of pump head are capable of both reciprocation and rotation during entry and exit from the cylinder.

Conventional valve pumps and peristaltic pumps are known to encounter various issues when used with a system of this type. For example, conventional valve pumps and peristaltic pumps, when connected to the primary pump's discharge port, often encounter difficulty with overcoming the head pressure within the system produced by the primary pump. For injection flow to occur in this configuration, injection pressures from peristaltic pumps and conventional valve pumps must exceed the pressure of the primary pump. While methods could be used to overcome this issue, use of these methods usually results in shut-down of the primary pump to eliminate pressure within the system so the secondary pump may prime. In addition, issues are frequently encountered with the vacuum pressures which occur at the intake-assembly for the primary pump when conventional valve pumps are used for injection purposes. These issues often result because conventional valve pumps have the potential of allowing migration of chemically-based fluids to the intake-assembly, even when the valve pump is in a passive state. Moreover, conventional valve pumps are known to produce injection rates which are excessively impractical for the system.

Use of peristaltic pumps with the system can potentially cause other issues. For example, fluctuating injection rates may occur due to capacitor unloading upon activation of a peristaltic pump. Peristaltic pumps are also known to have erratic injection rates attributable to fluctuating temperatures and correlated effects on the reflex characteristics of specified tubing materials.

Compared to pump heads used with conventional valve pumps, a secondary pump, using a valveless injection-type pump head is able to inject the chemically-based fluid into the intake-port assembly without encountering the aforementioned issues. One pump suitable for use in the system is the RHB Valveless Metering Pump, manufactured by Fluid Metering, Inc. Use of valveless injection-type pumps of this type are generally unaffected by vacuum-pressures associated with the primary pump. This type of pump includes a pump head having substantial chemical resistance, temperature ratings up to about 212° F. and pressures up to about 100 psi. When used with the system described herein, sealing elements included within the pump head substantially limit migration of the chemically-based fluid to the intake-port assembly, while the secondary pump is in a passive state.

Passive states can occur periodically during operation, shut-down, and maintenance of the system. The use of the aforementioned sealing elements prevents leakage and improper or potentially dangerous exposure of the chemically-based fluid. Depending on the chemical make-up of the chemically-based fluid, safety can be a concern when improper exposure occurs.

Figure 4:
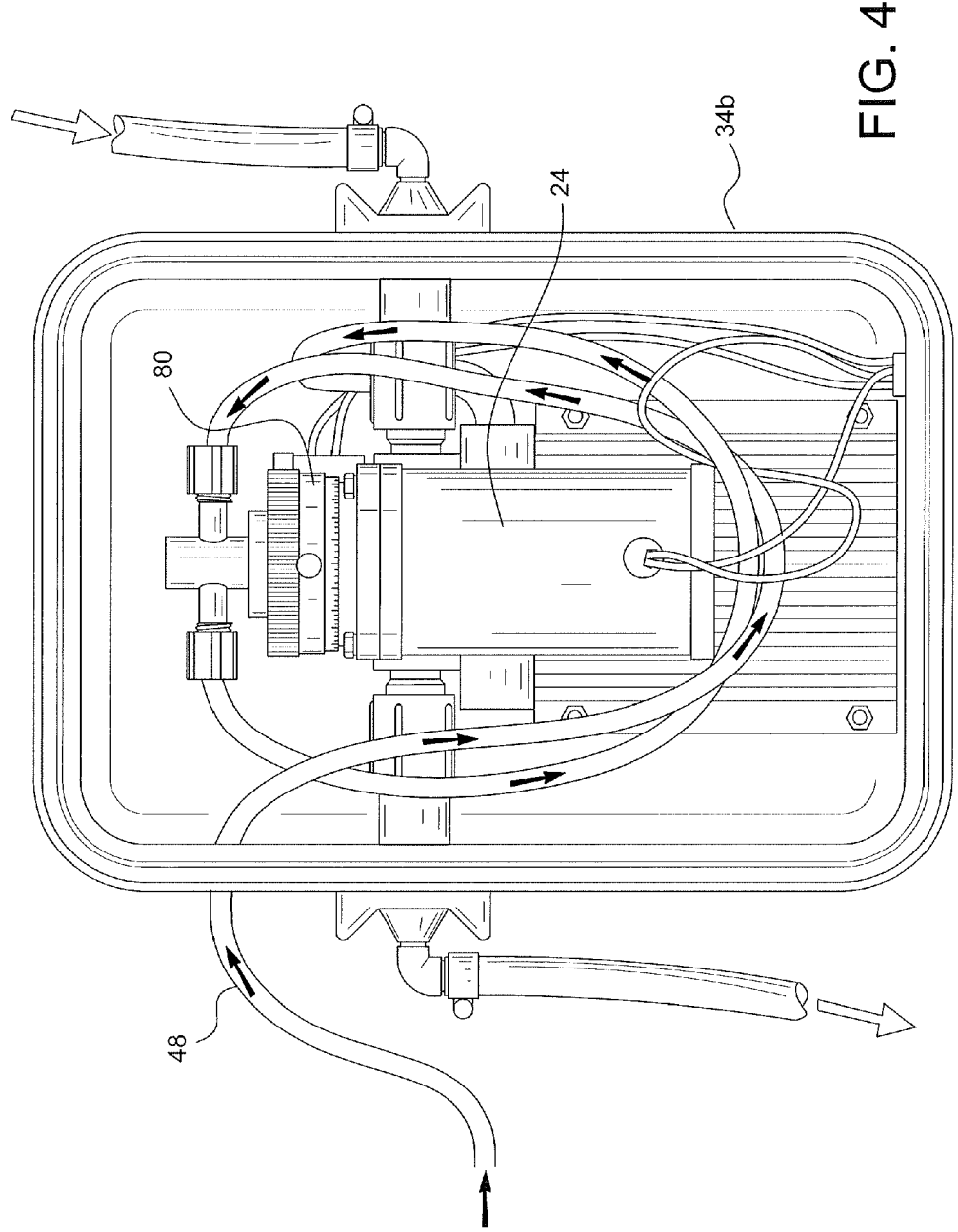
FIG. 4 shows a top view one embodiment of a secondary pump in a container.

As shown in FIG. 4, the secondary pump is also provided with metering controls 80 that allow for injection and maintenance of the chemically-based fluid at a metered flow rate, as specified by an operator. For example, an operator may choose to manually set a flow rate based upon the volume specified for the distribution assembly and/or a calibrated chemically-based fluid and diluent ratio.

Regardless of duty-cycle frequency or duration, the secondary pump is generally able to maintain selected injection rates, using the metering controls. The metering controls allow for synchronous movement of the secondary pump head and therefore a controlled rate of flow. By adjusting the pump head's position, for example, the piston stroke length changes, resulting in a direct change to the injection rate of the chemically-based fluid. The metering controls can also provide for discrete adjustments to the flow rate of the secondary pump, where the flow rate ranges from zero to 100% of the pump's rated flow rate. To allow for these types of discrete adjustment, the metering controls can further include a flow rate indicator 84 configured for flow rate adjustment at any specified interval.

Where the chemically-based fluid is an unadulterated pesticide concentrate, the injection rate may be specified as 3.2 fluid-ounces per minute, to emit a 1% solution from the distribution device while it is operating at a flow-rate of 2.5 gallons (320 ounces) per minute.

Disposed within the system are various conduits 48 which are used to couple the primary pump 22, the secondary pump 24, the intake-port assembly 26, the optional filtering assembly, and the distribution assembly 28.

After mixing of the diluent and chemically-based fluid in the intake-port assembly, the combined diluent and chemically-based fluid is routed through the primary pump, and through conduits 48 to the distribution assembly 28. Preferably, the conduits 48 are substantially transparent. Specifically, the distribution assembly is coupled to an outlet port of the primary pump using the conduits, through which discharge of the combined diluent and chemically-based fluid occurs.

Figure 3:
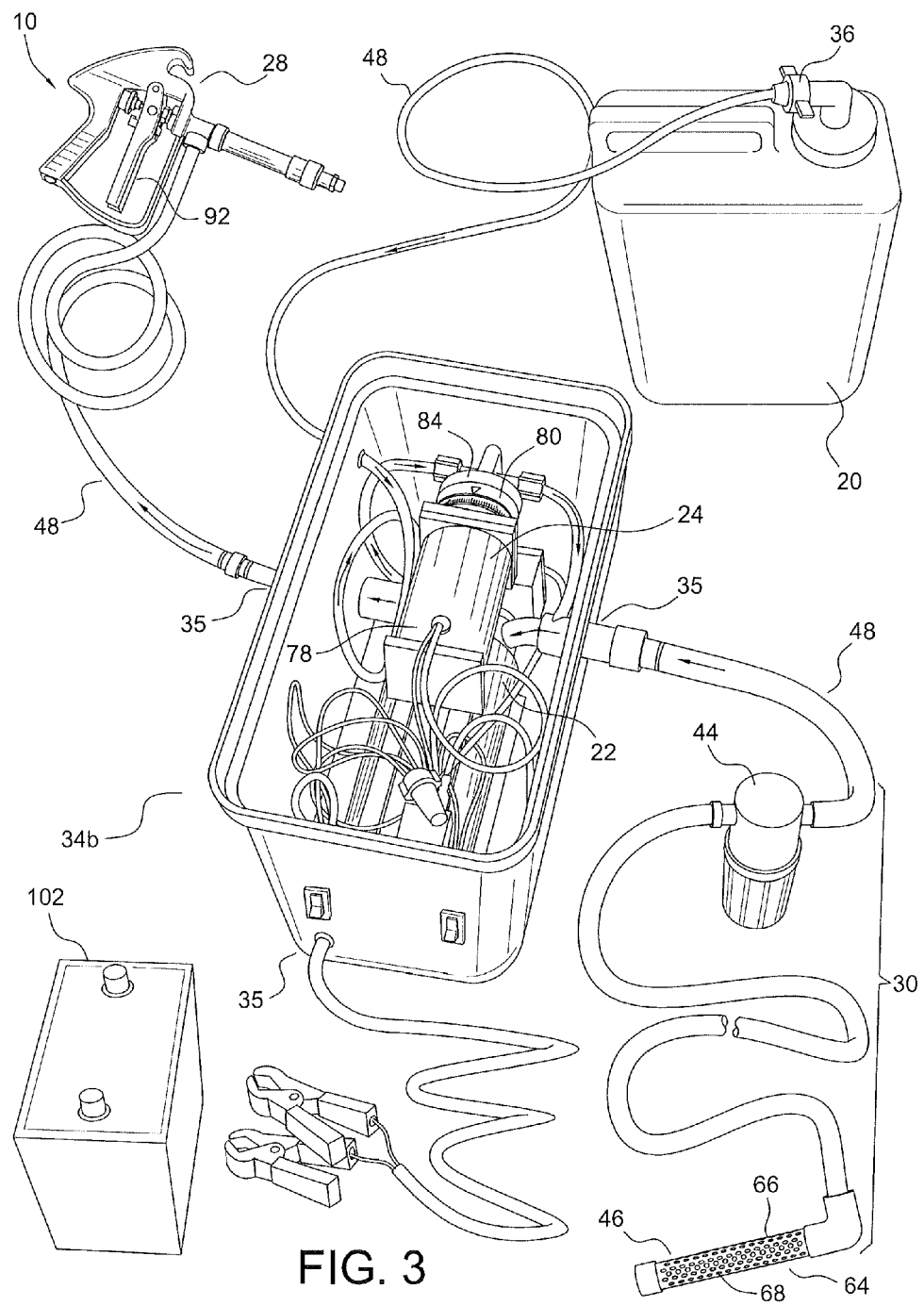
FIG. 3 is a top view of a second type of portable vegetation treatment system.

The distribution assembly 28 may include any assembly suitable for distributing the combined diluent and chemically-based fluid onto vegetation 120. Such assemblies may include spray guns assemblies, spray boom assemblies, and boomless spray nozzle assemblies. Suitable distribution assemblies include the AA43 GUNJET® Spray Gun manufactured by TeeJet Technologies, the Turbine Gun Model 7.901.26 manufactured by UDOR, and the "BoomBuster" Boomless Nozzle manufactured by Evergreen Products. FIGS. 1 and 3 show one type of distribution assembly 86 configured as a spray gun assembly, which is suitable for use in the portable vegetation system. The spray gun assembly may include one or more triggering mechanisms 92 that allow for one-hand operation and distribution of chemically-based fluids when the system is in use. Other components within the distribution assembly are preferably interchangeable, depending on the type of vegetation to be treated and the type of distribution desired. For example, a distribution assembly may include discs having orifices of various sizes and shapes and spray tips that allow for distribution adjustment and targeting.

The control system allows for operation of the vegetation treatment system and particularly operation of the primary pump and the secondary pump substantially in unison. In one configuration, the control system 100 includes a power source 102, a system control switch 104, a primary pump control switch 106, and a secondary pump relay switch 108. The control system 100 also includes wiring 110, which electrically couples the primary pump 22, secondary pump 24, and the power source 102. Such wiring may include one or more combination power-conducting and relay-triggering cables, referred to as the power supply relay ("PSR") cable.

In one configuration of the control system 100, the power source 102 is a battery having a DC voltage ranging from about 11.5 to about 14 volts, which may vary depending on voltage requirements of the primary and secondary pumps used in the system. However, other power sources may be utilized. Such sources, however, are preferably electric and/or provide for the system to be electrically powered. The power source and other components of the control system may be placed in a separate control container 101, as particularly shown in FIGS. 5A and 5B.

The system control switch 104 and the secondary pump relay switch 108 are configured respectively as on/off switches for control of overall system 100 and the secondary pump 24. The system control switch 104 is used to disable the on-demand pressure switch of the primary pump. Use of the control switch 104 also avoids accidental activation of the overall system 10.

The secondary pump relay switch 108 is included within the control system 100 to allow the secondary pump to operate as a slave to the primary pump. Thus, the secondary pump only operates upon activation of the primary pump. And, as discussed above, in preferred configurations of the portable vegetation treatment system, the primary pump only operates upon activation of the distribution assembly.

The control system may also be configured to prime or purge the system's 10 conduits. Priming the intake conduit, by activating only the primary pump without the intrusion of chemically-based fluids injected by the disabled secondary pump, allows for verification of unimpeded access to the diluent source before beginning treatment. After treatments are completed, purging the conduits of blended chemically-based fluids is necessary before storing or performing maintenance on the system. Optionally, the control system switching also incorporates LED lights, which enables an operator to visually verify switch-settings. The LED switch-lights may be mounted with visual prominence to the operator on the exterior of a container, such as the containers shown in FIGS. 2 and 3.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A portable vegetation treatment system, comprising:
    a primary pump having a discharge port and having an intake port configured to couple with a diluent source having a diluent;
    a secondary pump having a discharge port and having an intake port configured to couple with a reservoir containing a chemically-based fluid, wherein the secondary pump meters, substantially maintains flow rate of the chemically-based fluid, and substantially limits migration of the chemically-based fluid when the system is in a passive state;
    an intake-port assembly located between the diluent source and the primary pump intake port and also located between the secondary pump discharge port and the primary pump intake port, the intake-port assembly receives and combines the diluent and the chemically-based fluid before the diluent and the chemically-based fluid enter the primary pump intake port so that only the combined diluent and chemically-based fluid pass though the primary pump intake port; and
    a distribution assembly coupled to the discharge port of the primary pump that discharges the combined diluent and chemically-based fluid without any intervening flow direction changing control structure between the primary pump and the distribution assembly.

2. The portable vegetation treatment system of claim 1, wherein the secondary pump comprises at least one adjustment mechanism that regulates flow-rate of the secondary pump.

3. The portable vegetation treatment system of claim 1, wherein the distribution assembly comprises a sprayer assembly.

4. The portable vegetation treatment system of claim 3, wherein the sprayer assembly comprises at least one mechanism selected from the group consisting of spray guns, spray booms, and boomless spray nozzles.

5. The portable vegetation treatment system of claim 3, wherein a control system is configured to activate the primary pump and the secondary pump substantially in umson.

6. The portable vegetation treatment system of claim 1, wherein the secondary pump is a valveless section pump.

7. The portable vegetation treatment system of claim 4, wherein the sprayer assembly is configured to spray the combined diluent and chemically-based fluid up to at least 20 feet.

8. The portable vegetation treatment system of claim 1, further comprising one or more filtering elements disposed between the diluent source and the primary pump.

9. The portable vegetation treatment system of claim 5, wherein the control system comprises an on/off switch coupled to the primary pump.

10. The portable vegetation treatment system of claim 5, wherein the control system comprises a relay switch coupled to the secondary pump.

11. The portable vegetation treatment system of claim 10, wherein the relay switch is configured to purge one or more conduits coupled to the secondary pump.

12. The portable vegetation treatment system of claim 5, wherein the control system comprises LED lighting.

13. The portable vegetation treatment system of claim 1, further comprising a pre-filtering manifold coupled to an inlet of the primary pump.

14. The portable vegetation treatment system of claim 1, wherein the diluent source is a body of water.

15. The portable vegetation treatment system of claim 14, wherein the system is configured for placement on a floating vessel in the body of water.

16. The portable vegetation treatment system of claim 14, wherein the body of water is selected from the group consisting of wetlands, lakes, ponds, rivers, and canals.

17. The portable vegetation treatment system of claim 1, wherein the chemically-based fluid comprises components selected from the group consisting of pesticides and adjuvants.

18. The portable vegetation treatment system of claim 1, wherein the chemically-based fluid is an unadulterated pesticide concentrate.

19. The portable vegetation treatment system of claim 1, wherein the reservoir is coupled to a land-vehicle.

20. A process for treating vegetation, comprising:
   spraying a chemically-based fluid mixed with water-diluent, received from the portable vegetation treatment system as claimed in claim 1, onto vegetation or other targeted pest management sites and areas.

\* \* \* \* \*